(12) United States Patent
Laakmann et al.

(10) Patent No.: US 10,293,836 B2
(45) Date of Patent: May 21, 2019

(54) VEHICLE ASSISTANT SYSTEM AND VEHICLE

(71) Applicant: TRW AUTOMOTIVE GMBH, Alfdorf (DE)

(72) Inventors: Frank Laakmann, Mutlangen (DE);
Swen Schaub, Göppingen (DE);
Christian Mücke, Mögglingen (DE);
Christian Ammon, Berglen (DE);
Thomas Herpich, Uhlingen-Sparwiesen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 0 days.

(21) Appl. No.: 15/025,291

(22) PCT Filed: Oct. 8, 2013

(86) PCT No.: PCT/EP2013/003017
§ 371 (c)(1),
(2) Date: Mar. 28, 2016

(87) PCT Pub. No.: WO2015/051809
PCT Pub. Date: Apr. 16, 2015

(65) Prior Publication Data
US 2016/0229415 A1 Aug. 11, 2016

(51) Int. Cl.
*B60W 50/00* (2006.01)
*G06K 9/00* (2006.01)
(Continued)

(52) U.S. Cl.
CPC ......... *B60W 50/0098* (2013.01); *B60N 2/002* (2013.01); *B60N 2/0228* (2013.01);
(Continued)

(58) Field of Classification Search
None
See application file for complete search history.

(56) References Cited

U.S. PATENT DOCUMENTS 7,358,473 B2 4/2008 Aoki et al.
7,847,229 B2 12/2010 Aoki et al.
(Continued)

FOREIGN PATENT DOCUMENTS

CN 2491290 5/2002
DE 202008012289 1/2009
(Continued)

*Primary Examiner* — James M McPherson
(74) *Attorney, Agent, or Firm* — Tarolli, Sundheim, Covell & Tummino LLP

(57) ABSTRACT

The present invention relates to a vehicle assistant system of a vehicle comprising at least a first camera and a second camera, wherein the first camera is arranged such that the area in front of the vehicle can at least partially be captured, and wherein the second camera is arranged such that the interior of the vehicle can at least partially be captured, and wherein the vehicle assistant system comprises one common image data analysis unit which is configured to process image data received from the first camera and the second camera. Furthermore, the present invention relates to a vehicle comprising at least one vehicle assistant system.

24 Claims, 2 Drawing Sheets

(51) Int. Cl.
    *B60N 2/00*     (2006.01)
    *B60N 2/02*     (2006.01)
    *B60Q 9/00*     (2006.01)
    *B60R 11/04*     (2006.01)
    *B60R 21/0134*     (2006.01)
    *B60R 22/48*     (2006.01)
    *B60W 10/18*     (2012.01)
    *B60W 50/10*     (2012.01)

(52) U.S. Cl.
    CPC .............. *B60Q 9/008* (2013.01); *B60R 11/04* (2013.01); *B60R 21/0134* (2013.01); *B60R 22/48* (2013.01); *B60W 10/18* (2013.01); *B60W 50/10* (2013.01); *G06K 9/00791* (2013.01); *G06K 9/00832* (2013.01); *B60W 2420/42* (2013.01); *B60W 2540/00* (2013.01); *B60W 2550/10* (2013.01)

(56) References Cited

U.S. PATENT DOCUMENTS

| | | |
|---|---|---|
| 2001/0010424 A1 | 8/2001 | Osmer et al. |
| 2002/0113875 A1* | 8/2002 | Mazzilli .................... B60R 1/12 348/148 |
| 2003/0025793 A1* | 2/2003 | McMahon ............. H04N 7/181 348/148 |
| 2007/0187573 A1 | 4/2007 | Aoki et al. |
| 2007/0189749 A1 | 8/2007 | Aoki et al. |
| 2007/0228705 A1* | 10/2007 | Rao ..................... B60R 21/0134 280/735 |
| 2007/0229662 A1 | 10/2007 | Aoki et al. |
| 2010/0253489 A1 | 10/2010 | Cui et al. |
| 2010/0253594 A1* | 10/2010 | Szczerba ............... G01S 13/723 345/7 |
| 2013/0113910 A1 | 5/2013 | Kim |
| 2013/0311641 A1* | 11/2013 | Chow ..................... G08G 1/04 709/224 |
| 2014/0316659 A1* | 10/2014 | Lee .................. B60R 21/01538 701/45 |

FOREIGN PATENT DOCUMENTS

| | | |
|---|---|---|
| DE | 102010005427 | 9/2010 |
| DE | 102010028140 | 3/2013 |

\* cited by examiner

VEHICLE ASSISTANT SYSTEM AND VEHICLE

This application claims priority from PCT/EP2013/003017, filed Oct. 8, 2013, the subject matter of which is incorporated herein by reference in its entirety.

BACKGROUND OF THE INVENTION

The present invention relates to a vehicle assistant system for a vehicle and to a vehicle comprising a vehicle assistant system.

Vehicle assistant systems ara already known and are made use of to assist the driver by, e.g., a lane departure warning, a lane control assistance, an autonomous emergency brake, a park distance, an autonomous park guiding or the like. These assistant systems normally use a camera which captures image data from the area in front of the car. Based on this image data an analysis of the current driving situation is made and the data are used for the lane departure warning, the lane control assistance, the autonomous emergency brake, the park distance, the autonomous park guiding or the like.

Furthermore, adaptive occupant restraint systems are known, which are used to increase the safety of the occupant of a vehicle, e.g. in case of a crash.

For example, US 2013/0113910 A1 describes a driving assistant system and method which synthetically determines a speed of a vehicle, a driver's inattention, a road condition, and the like and provides a warning corresponding to a degree of risk (risk level) to the driver. Also, there is a camera configured to photograph the driver's face and a controller configured to analyze image information photographed by the camera and output status information corresponding to the driver's status based on an analysis result.

DE 10 2010 028 140 A1 describes a driver assistance method in a motor vehicle which involves performing automatic steering correction such that a vehicle departure from a currently traveled lane is prevented, while compensating movement of the steering handle of the steering system. There may be cameras which monitor the surrounding area of the vehicle, and the image date of these cameras may be used for the driver assistance.

The above systems are self-contained systems which are separately installed in a vehicle. Installing all systems in one vehicle is not always possible for cost reasons.

However, it would be desirable to obtain an improved vehicle assistant system at lower costs.

SUMMARY OF THE INVENTION

It is therefore an object of the present invention to improve a vehicle assistant system and a vehicle with a vehicle assistant system. In particular in that the structure of such a vehicle assistant system is less complex and may be built and manufactured at lower costs.

The above object is achieved according to the present invention by a vehicle assistant system with the features of claim 1. Accordingly, the vehicle assistant system of a vehicle comprises at least a first camera and at least one second camera, wherein the first camera is arranged such that the area in front of the vehicle can at least partially be captured, and wherein the at least one second camera is arranged such that the inferior of the vehicle can at least partially be captured, and wherein the vehicle assistant system comprises one common image data analysis unit which is configured to process data received from the first camera and the at bast one second camera.

It is possible that the vehicle assistant system comprises a driver assistant system so that systems may be merged and components of the vehicle assistant system may also be used by a driver assistant system. Thus, already existing components may be used.

The present invention provides a hybrid system with a driver assistant system being capable of assisting the driver during driving by capturing (which may include recording) the front area of the vehicle and to use the at least one second camera of the vehicle assistant system to check the interior of the vehicle. All data is processed in one common image data analysis unit so that an additional, separate data analysis unit for the second camera(s) may be dispensed with.

The front area of the vehicle may be monitored by the first camera, in particular for providing driving assistance functions to enhance the driving safety. Additionally, the occupants in the interior of the car are monitored by the second camera(s).

Both cameras may be installed into a compact unit and this unit may be placed at any suitable location in the vehicle, for example in the region of the front window of the vehicle. Such a structure and such an arrangement provide the advantage that the unit may be easily installed into a vehicle and that the overall weight and costs of the system can be reduced.

As an alternative, the second camera can be arranged separate from the first camera and arranged in a separate housing. Numerous second cameras may be provided, e.g. one camera each for the front passengers and one or more second cameras for the rear passengers. A second camera could be arranged within or close to the interior lighting unit for the front or rear passengers.

The image data analysis unit may be an image processor to which both cameras are connected in order to deliver image data.

Existing hardware and software may be utilized by means of the common image data analysis unit. Thus, a cost effective solution may be achieved.

Furthermore, there is a cost benefit compared to conventional occupant classification systems which normally use seat mats or other electrical sensors, e.g. capacitive sensors. These seat mats or sensors are capable of monitoring and checking the presence of an occupant and of determining the weight of the occupant. The use and exchange of such seat mats is however quite costly. The present invention defines a modular approach for simple vehicle integration of a system which monitors the occupants and alms to eliminate use of seat mats or other electrical sensors for determining presence of passengers. A further occupant presence system or occupant classification system which is cost-intensive and which can become superfluous by the present invention is a seat track sensor. The data of such systems can now be delivered by the second camera(s).

Additionally, it is possible that the driver assistant system comprises at least one of a lane departure warning system, a lane control assistant system, an autonomous emergency braking system, a pedestrian autonomous braking system, a cross traffic warning system or the like, wherein the first camera provides data for at least one of the lane departure warning system, the lane control assistant system, the autonomous emergency braking system, the pedestrian autonomous braking system, the cross traffic warning system or the like.

Therefore, the advantages achieved with an existing video unit for external sensing may be used. Such a video unit may be a camera (mono/stereo), e.g. a mono camera for a lane departure warning or a stereo camera for an autonomous emergency braking system, e.g. for detecting vehicles in the pathway in front of the vehicle or pedestrians.

There may be at least one camera unit comprising a lense and a video chip and at least one image analyzing unit comprising the necessary hardware and software.

Furthermore, it is possible that the common image data analysis unit is connected to at least one active adaptive occupant restraint system.

The image data analysis unit may be capable of interpreting the image data received from the second camera(s) and of providing control input data for both the driver assistant system and the occupant restraint system.

According to one option, the occupant restraint system is capable of controlling at least one of a vehicle seat, a seat position, a seatbelt, an airbag and a pre-crash safety device. A pre-crash safety device may act in case that an accident and/or the crash type severity is predicted with a likelihood above a predetermined threshold value and may comprise at least one of a closing sunroof system, a closing side window system, a seatbelt pretensioning system and/or the like. The restraint system can be adapted to the predicted severity of the crash.

According to another option, the active adaptive occupant restraint system is at least one of a crash type severity and an occupant adaptive system, i.e. the kind and level of restraining effects of the restraint system are optimized depending on the occupant's characteristics such as the occupant's height, shape, weight, posture, position within the vehicle and ago or proximity to the airbag module, which information is determined on the basis of the image data provided by the second camera(s).

Active adaptive occupant restraint systems could also comprise pre-crash triggered systems like active control retractors (ACR) being able to exert limited or fell restraint forces depending on the situation or like active buckle lifters (ABL) being able to actively increase the bolt tension by buckle displacement via an electric drive in dynamic drive situations (fast curve driving) or critical situations such as panic braking or loss of stability. After a crash, the ABL can lift the buckle to facilitate unbuckling.

The image data analysis unit may be capable of detecting and e.g. classifying an occupant with respect to at least one of the above occupant's characteristics.

Further, the image data analysis unit may be capable of identifying a restraint system usage status, in particular of identifying seatbelt routing and/or whether a child seat is properly installed and/or potential hazardous situations, or of identifying the entry and/or presence of an occupant on the basis of the image data provided by the second camera(s) or the status of any other safety or comfort unit like an active seatbelt presenter (ASBP) or Moreover, the vehicle assistant system can comprise the active adaptive occupant restraint system.

The adaptive occupant restraint system may comprise at least one of adaptive seat elements like a variable seat ramp, a variable seat upholstery shape, a variable seat upholstery stiffness, a variable seat back angle, a variable head rest, adjustable leg and foot rests or the like. Also, there may be adaptive seatbelt system elements like variable effective belt fixation points, variable belt routing, variable pretensioning units, variable energy management units or the like.

There may be adaptive airbag system elements provided to achieve a variable shape of the airbag, a variable size of the airbag, a variable contour of the airbag, a variable stiffness, a variable deployment speed, a variable deployment direction or the like.

The second camera may be at least one additional camera unit facing inside the vehicle which is added to an existing video unit for external sensing. There may be a camera adjustment selectable to have one, several or all occupants on the image.

Also, there may be an additional e.g. infrared lighting during the night. It is also possible that the mounting position of the infrared light source is close to the already existing external video camera unit, i.e. the first camera.

For the integration into the system the second camera may run with significantly less fps (i.e. frames per second) than the outside camera, e.g. the first camera. The image data analysis unit is used to additionally process the images from the interior, e.g. the second camera, using multiplexing.

Thus the first camera is processed with e.g. 30 fps and the second camera with 1 fps. In other words, in a first step there may be processed 29 images from the first camera in a row and then 1 image of the interior camera will be processed. Afterwards again 29 images of the first camera will be processed and so on.

The second camera can be processed with different modes having different frame rates, e.g. a lower frame rate during a pre-crash situation and a higher frame rate at or after a crash (post-crash situation).

For the image analysis, additional pattern recognition algorithms could be installed in the image analyzing unit to analyze the camera frames from the second camera. Furthermore, there may be a pattern recognition algorithm or algorithms which allow generating additional signals like "seat occupied with human!", "height/shape of the occupant" signals, which allows a weight estimation, "posture/position with respect to the restraint system" for a proper restraint system actuation.

The vehicle assistant system may also be used as an extension for the airbag control unit and/or for the safety domain controller. The additional signals coming from the second camera may be used together with already existing signals for the airbag control unit. Adequate (adaptive) parameters may be selected for given crash situations.

Furthermore, adaptive features of connected restraint systems may be activated sequentially or in parallel, e.g. variable force limits for adaptive seatbelt systems. Also, it is possible to control and adapt the restraint functions during a crash event.

The adaption to the crash type/severity may be based on impact parameters like relative speed, impact direction, impact point on a vehicle, impacting object characteristics like relative speed, mass, contour, overlap, stiffness, surface and integrity and/or sequence of impacts like a multi impact crash event.

Moreover, the first camera and the second camera can be arranged next to a common housing or within a common housing.

The common housing is e.g. a housing of a rear mirror mounted on or next to a front window of the vehicle.

The vehicle assistant system is e.g. operable in a seat adjustment mode and the second camera is capable of capturing movements and/or gestures of the occupant to adjust the position of the seat of the occupant by a motor drive based on the movement and/or gesture of the occupant. The seat may be adjusted regarding its position by the occupant very intuitively.

In particular, it is possible that the image data analysis unit is capable of interpreting the image data received from the second camera and of providing control input data for seat position adjustment means based on the movement and/or gestures of the occupant.

A third camera can be provided to capture data from an area behind the vehicle, wherein the third camera is coupled to the common data analysis unit. The third camera may provide image data which are used for assistance functions comprising at least one of predicting a possible rear end collision and park distance control or the like.

Additionally, the present invention relates to a vehicle comprising at least one vehicle assistant system according to the invention.

For example, the vehicle is equipped without seat mats, which are capable of monitoring and checking whether a seat is occupied and to determine the weight of the occupant. The present invention makes it possible to monitor and check whether a seat is occupied by the vehicle assistant system using the second camera monitoring the interior of the vehicle.

BRIEF DESCRIPTION OF THE DRAWINGS

Further features and advantages of the present invention will be described hereinafter and in connection with the drawings.

DESCRIPTION

Figure 1:
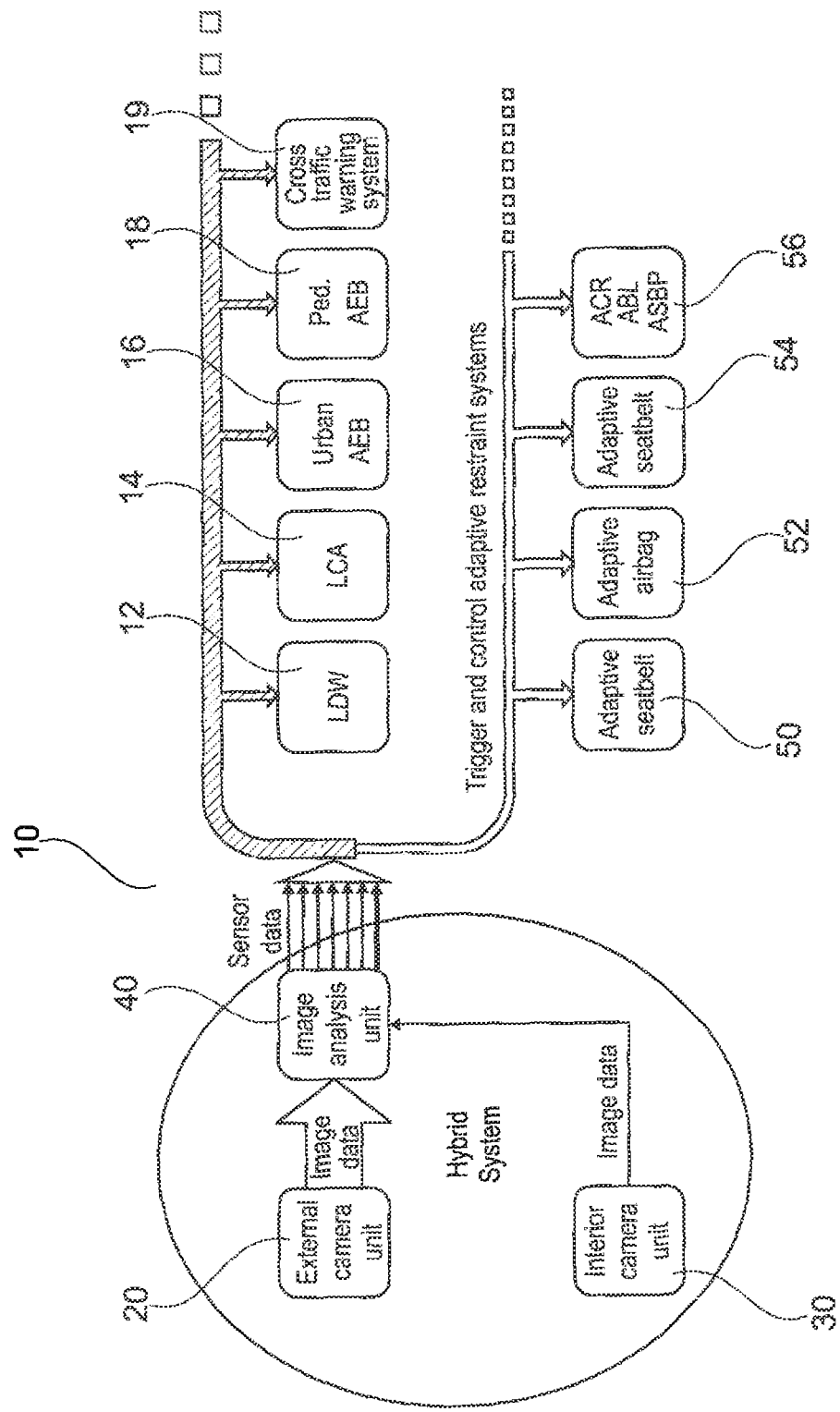
FIG. 1 shows a schematical overview of the vehicle assistant system according to the present invention installed into a vehicle according to the present invention.

FIG. 1 shows a vehicle assistant system 10 for a vehicle 100 comprising at least a first camera 20 and a second camera 30. The first camera 20 is an external camera unit which is arranged such that the area in front of the vehicle 100 can be captured.

The vehicle assistant system comprises a driver assistant system which comprises e.g. a lane departure warning system 12, a lane control assistant system 14, an urban autonomous emergency braking system 16, a pedestrian automatic emergency braking system 18 and/or a cross traffic warning system 19 or the like.

For monitoring and checking which seats are occupied, the vehicle assistant system 10 comprises a second camera 30 monitoring the interior of the vehicle 100. Therefore, vehicle 100 is not equipped with seat mats able to monitor and check the occupancy of the seats and able to determine the weight of the occupant.

Figure 2:
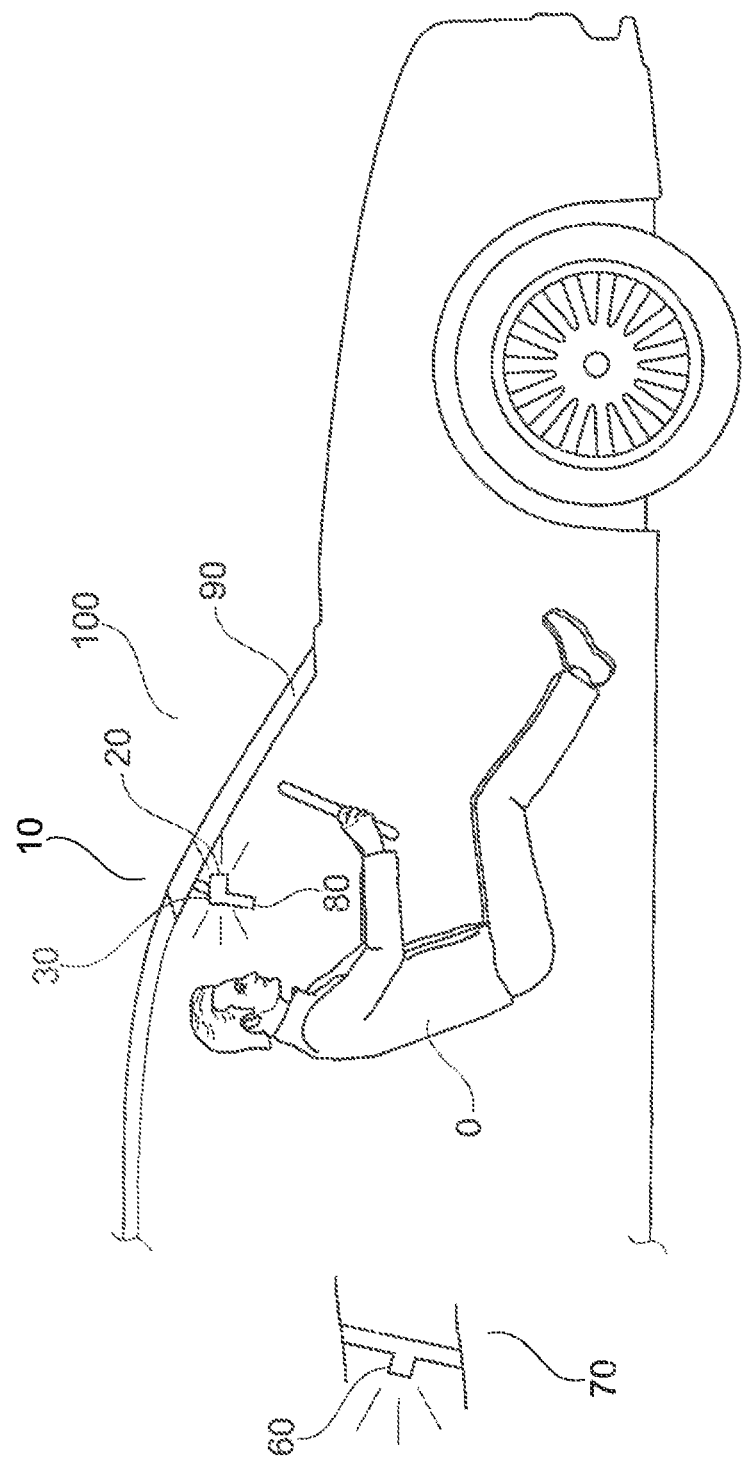
FIG. 2 shows a schematical overview of a vehicle according to the present invention equipped with the vehicle assistant system according to the present invention.

As can be seen from FIGS. 1 and 2, the vehicle assistant system is a hybrid system comprising the driver assistant system and at least one occupant restraint system.

Data obtained from the first and second cameras 20, 30 are received by one common image data analysis unit 40 in the form of an image processor.

The first camera 20 and the second camera 30 are arranged within the housing of a rear mirror 80 mounted on the front window 90 of the vehicle 100 (see FIG. 2).

However, more than one second camera 30 can be provided, e.g. cameras 30 for each front passenger and one common or separate cameras 30 for the rear passengers.

Further, the second camera can be arranged distanced from the first camera 30 in another housing, i.e. the housing of the interior lighting, and coupled to unit 40 by cables.

The image data analysis unit 40 is connected to one or more adaptive occupant restraint systems, more particularly to the control device or devices of the at least one adaptive occupant restraint system.

Examples of occupant restraint systems are an adaptive seatbelt system 50, an adaptive airbag 52, an adaptive seat 54, an active control retractor (ACR), an active belt lifter (ABL) and an active seatbelt presenter (ASBP) which are figuratively combined in one box 56.

The seatbelt system 60 can be adapted by exerting different restraining forces to the occupant e.g. by a switchable force limiter or by a multiple-stage inflator. Furthermore, the belt fixation points within the vehicle and the belt routing and/or pretensioning can be adapted to crash or occupant-specific data.

Multiple-stage inflators or the like can also be used to adapt the airbag to the position, to characteristics of the occupant or to a respective crash situation. It is, therefore, possible to vary and adapt the shape, size, contour, stiffness, deployment speed and/or deployment direction of the airbag.

In order to adapt the seat to the crash situation and to the occupant's parameters, the seat ramp, the seat upholstery shape, the seat upholstery stiffness, the seat back angle, the leg and foot rests and/or the head rest position can be actively changed and adapted.

In one mode, the vehicle assistant system only controls the driver assistant system or delivers the required data for controlling the driver assistant system. However, in case of an accident i.e. a second mode, data received from the first and second cameras 20, 30 are used to optimize and adapt restraining of the occupant.

Image data obtained from the first camera 20 is sent to the common image data analysis unit 40 which is configured to process the image data received. This data is sent as sensor data to the lane departure warning system 12, the lane control assistant system 14, the urban autonomous emergency braking system 16, the pedestrian automatic emergency braking system 18 and/or the cross traffic warning system 19.

Second camera or cameras 30 monitoring the interior of the vehicle obtains data which is sent to common image data analysis unit 40. Unit 40 analyzes, interprets and translates this data into sensor data delivered to the adaptive occupant restraint system(s). This data is used to trigger and to control the adaptive occupant restraint systems, e.g. the adaptive seatbelt system 50, the adaptive airbag 52, the adaptive seat 54.

Such sensor data can comprise occupant characteristics like height, size, physical constitution, position, posture, handicap status and age of the occupant. Further the proximity of the occupant to the airbag module can be sensor data achieved from the camera.

Furthermore, the belt routing, the correct or incorrect installation of the child seat, or any potential hazardous situations can be determined. Further, the status of other safety or comfort units like a belt presenter or an active buckle lifter can be checked as well as presence or entry of passengers.

Depending on the occupant restraint systems provided, some or all of this data is sent to the at least one occupant restraint system control unit.

The occupant restraint system control unit obtains further data for example concerning the impact parameters, such as relative speed, impact direction, impact point on the vehicle, mass, contour, overlap, stiffness of the vehicle and the like.

Also, the occupant restraint system control unit may obtain data concerning multi-impact crashes.

Therefore, the vehicle assistant system 10 defines an extension or support unit for the occupant restraint system(s).

It is possible to activate corresponding features of occupant restraint systems sequentially or simultaneously even during a crash.

The image data analysis unit is capable of detecting and classifying an occupant regarding the occupant's height and/or shape and/or weight and/or posture and/or position and/or age.

It is possible that the first and second cameras 20, 30 run with different fps, more particularly, the second camera 30 may run with significantly less fps than the first camera 20.

The image data analysis unit 40 additionally processes the images from the second camera 30 using multiplexing, e.g. by using a 30 fps camera 20 and a 1 fps second camera 30. In a first step, 29 images from the first camera are processed in a row. Afterwards, 1 image of the second camera 30 is processed. Afterwards, 29 images of the first camera 20 are processed and so on.

The second camera(s) 30 can be processed in different modes, e.g. a first, standard, pre-crash mode and a second, crash or post-crash mode during which the occupants are permanently monitored by a higher frame rate than in the standard mode. Due to the high frame rate, the camera provides exact and sufficient data for tailoring the adaptive restraint systems during the crash, e.g. data concerning front and side displacement of the occupant.

During the crash, the unit 40 does not require processing power for the data of first camera 20. Therefore, unit 40 has sufficient processing power to handle and process the increased data volume received by camera 30.

For the image analysis, additional pattern recognition algorithms may be installed in the image data analysis unit 40 to analyze the camera frames from the second camera 30. A pattern recognition algorithm or algorithms are provided to generate additional signals such as "seat occupied with human?"; "height/shape of the occupant", which allows for a weight estimation; and "posture/position with respect to the restraint system", which allows for the identification of out-of-position situations of an occupant.

The vehicle assistant system 10 can be operable in a seat adjustment mode. The second camera 30 is capable of capturing movements and/or gestures of the occupant O to adapt and/or adjust the position of the seat of the occupant O by actuating a corresponding motor associated to the seat. The image data analysis unit 40 or a control unit obtaining data from the image data analysis unit 40 is capable of interpreting the image data received from the second camera 30 and of providing control input data for a seat position adjustment control or directly controls seat position adjustment means based on the movement and/or gesture of occupant O.

Of course, active comfort systems for the rear occupants can also be controlled by movement/gesture of the rear occupants.

Moreover, there is a third camera 60 provided at the rear end 70 of the vehicle 100 which is configured and arranged to capture data from an area behind the vehicle, wherein the third camera is coupled to the common data analysis unit 40.

The third camera 60 provides image data which is used for assistance functions, here for predicting a possible rear end collision and park distance control.

The third camera 60 can be arranged within the passenger compartment or outside thereof.

The invention claimed is:

1. A vehicle assistant system of a vehicle comprising at least a first camera and at least one second camera, wherein the first camera is arranged such that an area in front of the vehicle can at least partially be captured and wherein the at least one second camera is arranged such that an interior of the vehicle can at least partially be captured, and wherein the vehicle assistant system comprises one common image data analysis unit which is configured to process image data received from the first camera and the at least one second camera, wherein the common image data analysis unit is connected to at least one active adaptive occupant restraint system, wherein the common image data analysis unit is configured to detect and classify an occupant's characteristics regarding at least one of an occupant's shape, weight, position within the vehicle, age and proximity to an airbag based on the image data provided by the at least one second camera, and wherein the active adaptive occupant restraint system adapts kind and level of restraining effects to be applied based on the occupant's characteristics detected and classified by the common image data analysis unit.

2. The vehicle assistant system according to claim 1, wherein the vehicle assistant system comprises a driver assistant system.

3. The vehicle assistant system according to claim 2, wherein the driver assistant system comprises at least one of a lane departure warning system, a lane control assistant system, an autonomous emergency braking system, a pedestrian autonomous braking system, a cross traffic warning system, and wherein the first camera provides image data for at least one of the lane departure warning system, the lane control assistant system, the autonomous emergency braking system, the pedestrian autonomous braking system, the cross traffic warning system.

4. The vehicle assistant system according to claim 2, wherein the common image data analysis unit is capable of configured to interpret the image data received from the at least one second camera and provide control input data for both the driver assistant system and the at least one active adaptive occupant restraint system.

5. The vehicle assistant system according to claim 1, wherein the at least one active adaptive occupant restraint system is configured to control at least one of a vehicle seat, a seat position, a seatbelt, an airbag, a pre-crash safety device, an active control retractor, an active belt lifter and an active seatbelt presenter.

6. The vehicle assistant system according to claim 1, wherein the at least one active adaptive occupant restraint system is at least one of a crash type severity system and an occupant adaptive system.

7. The vehicle assistant system according to claim 1, wherein the common image data analysis unit is configured to identify at least one of a restraint system usage status, whether a child seat is properly installed, any hazardous situations, and an entry of an occupant, based on the image data provided by the at least one second camera.

8. The vehicle assistant system according to claim 1, wherein the first camera and the at least one second camera are arranged next to a common housing or within the common housing.

9. The vehicle assistant system according to claim 8, wherein the common housing is a housing of a rear mirror mounted on or next to a front window of the vehicle.

10. The vehicle assistant system according to claim 1, wherein the vehicle assistant system is operable in a seat adjustment mode and the at least one second camera is configured to capture at least one of movements and gestures of an occupant to adjust a position of a seat of the occupant by a motor based on at least one of the movements and the gestures of the occupant.

11. The vehicle assistant system according to claim 1, wherein a third camera is provided at a rear end of the vehicle to capture data from an area behind the vehicle, wherein the third camera is coupled to the common data analysis unit.

12. The vehicle assistant system according to claim 1, wherein the second camera is adapted to work in at least two different modes wherein one mode is a post-crash mode in which the second camera works with a higher frame rate than in another mode.

13. A vehicle assistant system of a vehicle comprising at least a first camera and at least one second camera, wherein the first camera is arranged such that an area in front of the vehicle can at least partially be captured and wherein the at least one second camera is arranged such that an interior of the vehicle can at least partially be captured, and wherein the vehicle assistant system comprises one common image data analysis unit which is configured to process image data received from the first camera and the at least one second camera,
- wherein the common image data analysis unit is connected to at least one active adaptive occupant restraint system,
- wherein the common image data analysis unit is configured to identify at least one of a restraint system usage status, whether a child seat is properly installed, and any hazardous situations based on the image data provided by the at least one second camera, and
- wherein the active adaptive occupant restraint system is configured to adapt restraining of an occupant based on the image data that the common image data analysis unit received from the first and second cameras and processed.

14. The vehicle assistant system according to claim 13, wherein the vehicle assistant system comprises a driver assistant system.

15. The vehicle assistant system according to claim 14, wherein the driver assistant system comprises at least one of a lane departure warning system, a lane control assistant system, an autonomous emergency braking system, a pedestrian autonomous braking system, or a cross traffic warning system, wherein the first camera provides image data for at least one of the lane departure warning system, the lane control assistant system, the autonomous emergency braking system, the pedestrian autonomous braking system, or the cross traffic warning system.

16. The vehicle assistant system according to claim 14, wherein the common image data analysis unit is configured to interpret the image data received from the at least one second camera and provide control input data for both the driver assistant system and the at least one active adaptive occupant restraint system.

17. The vehicle assistant system according to claim 13, wherein the at least one active adaptive occupant restraint system is configured to control at least one of a vehicle seat, a seat position, a seatbelt, an airbag, a pre-crash safety device, an active control retractor, an active belt lifter and an active seatbelt presenter.

18. The vehicle assistant system according to claim 13, wherein the at least one active adaptive occupant restraint system is at least one of a crash type severity system and an occupant adaptive system.

19. The vehicle assistant system according to claim 13, wherein the common image data analysis unit is configured to detect and classify an occupant regarding at least one of an occupant's height, shape, weight, posture, position within the vehicle, age and proximity to an airbag based on the image data provided by the at least one second camera.

20. The vehicle assistant system according to claim 19, wherein the vehicle assistant system is operable in a seat adjustment mode and the at least one second camera is configured to capture at least one of movements and gestures of an occupant to adjust the position of the seat of the occupant by a motor based on at least one of the movements and the gestures of the occupant.

21. The vehicle assistant system according to claim 13, wherein the first camera and the at least one second camera are arranged next to a common housing or within the common housing.

22. The vehicle assistant system according to claim 21, wherein the common housing is a housing of a rear mirror mounted on or next to a front window of the vehicle.

23. The vehicle assistant system according to claim 13, wherein a third camera is provided at a rear end of the vehicle to capture data from an area behind the vehicle, wherein the third camera is coupled to the common data analysis unit.

24. The vehicle assistant system according to claim 13, wherein the second camera is adapted to work in at least two different modes wherein one mode is a post-crash mode in which the second camera works with a higher frame rate than in another mode.

* * * * *

UNITED STATES PATENT AND TRADEMARK OFFICE
CERTIFICATE OF CORRECTION

PATENT NO. : 10,293,836 B2
APPLICATION NO. : 15/025291
DATED : May 21, 2019
INVENTOR(S) : Frank Laakmann et al.

Page 1 of 1

It is certified that error appears in the above-identified patent and that said Letters Patent is hereby corrected as shown below:

On the Title Page

Item (72) Inventors:
Reads "Herpich, Uhlingen-Sparwiesen (DE)"
Should read --Herpich, Uhingen-Sparwiesen (DE)--

Signed and Sealed this
Twenty-sixth Day of November, 2019

Andrei Iancu
*Director of the United States Patent and Trademark Office*